US006200489B1

(12) United States Patent
Dzhragatspanyan et al.

(10) Patent No.: US 6,200,489 B1
(45) Date of Patent: Mar. 13, 2001

(54) LIQUID MIXTURE SEPARATION SYSTEM

(75) Inventors: Misak Dzhragatspanyan, North Hollywood; William A. Greene, Gardena, both of CA (US)

(73) Assignee: Spintek Systems, Inc., Huntington Beach, CA (US)

( * ) Notice: Subject to any disclaimer, the term of this patent is extended or adjusted under 35 U.S.C. 154(b) by 197 days.

(21) Appl. No.: 08/790,373

(22) Filed: Jan. 28, 1997

Related U.S. Application Data

(60) Provisional application No. 60/010,733, filed on Jan. 29, 1996.

(51) Int. Cl.[7] .......... C02F 1/40

(52) U.S. Cl. .......... 210/799; 210/800; 210/307; 210/416.1; 210/499; 210/DIG. 5; 210/540

(58) Field of Search .......... 210/799, 800, 210/258, 307, 416.1, 493.1, 499, 538, 540, DIG. 5

(56) References Cited

U.S. PATENT DOCUMENTS 2,651,414 * 9/1953 Larson .......... 210/DIG. 5
3,016,345 * 1/1962 Price .......... 200/DIG. 5
3,231,091 * 1/1966 Kingsbury et al. .......... 210/DIG. 5
3,426,910 * 2/1969 Winzen .......... 210/499
3,645,398 2/1972 Fiocco .
3,878,094 * 4/1975 Conley et al. .......... 210/DIG. 5
3,977,975 8/1976 Geurtsen .
4,308,136 12/1981 Warne, Jr. .
4,430,222 2/1984 Walker .
4,493,772 1/1985 Tanaka .
4,591,441 5/1986 Sakai .
4,892,667 1/1990 Parker, III .
5,350,527 9/1994 Kitko .
5,374,351 12/1994 Bolton .
5,468,385 * 11/1995 Inoue .......... 210/DIG. 5

FOREIGN PATENT DOCUMENTS 2 001 542 7/1979 (GB) .

* cited by examiner

*Primary Examiner*—Christopher Upton
(74) *Attorney, Agent, or Firm*—Leon D. Rosen

(57) ABSTRACT

A system is described for separating first and second liquids that are present in an intimate mixture consisting primarily of the first liquid, which enables recovery of a high proportion of the second liquid in a system of moderate cost for construction and operation. The system includes a fine screen formed of woven threads of a material that is wetted by the second liquid. The mixture is pumped through the screen, causing the microscopic droplets of the second liquid to coalesce into much larger drops, so the drops can be rapidly recovered. The screen is very fine, with a thread count of at least 500 per inch (20 per millimeter), and the liquid is passed very slowly through the screen, at a velocity of no more than 12 inches per minute (30 cm./min.), to recover at least 70% and preferably at least 75% of the second liquid.

9 Claims, 3 Drawing Sheets

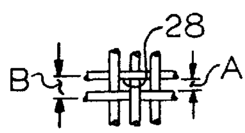
FIG. 11
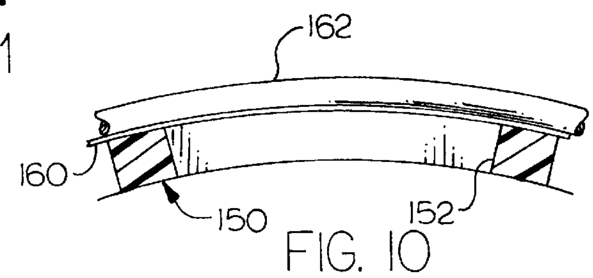
FIG. 10
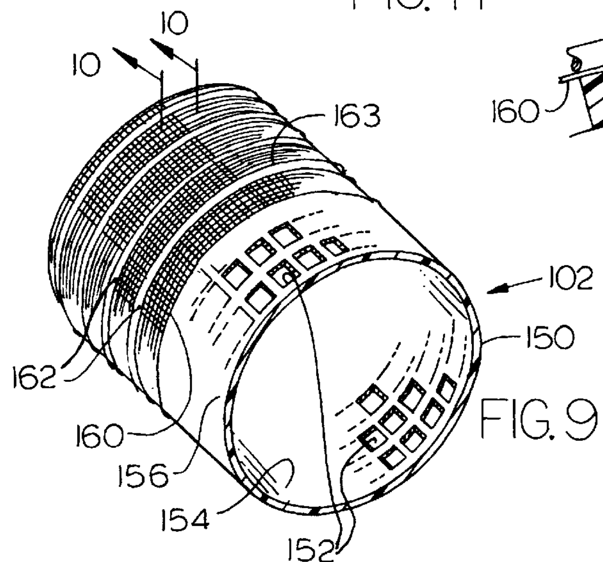
FIG. 9
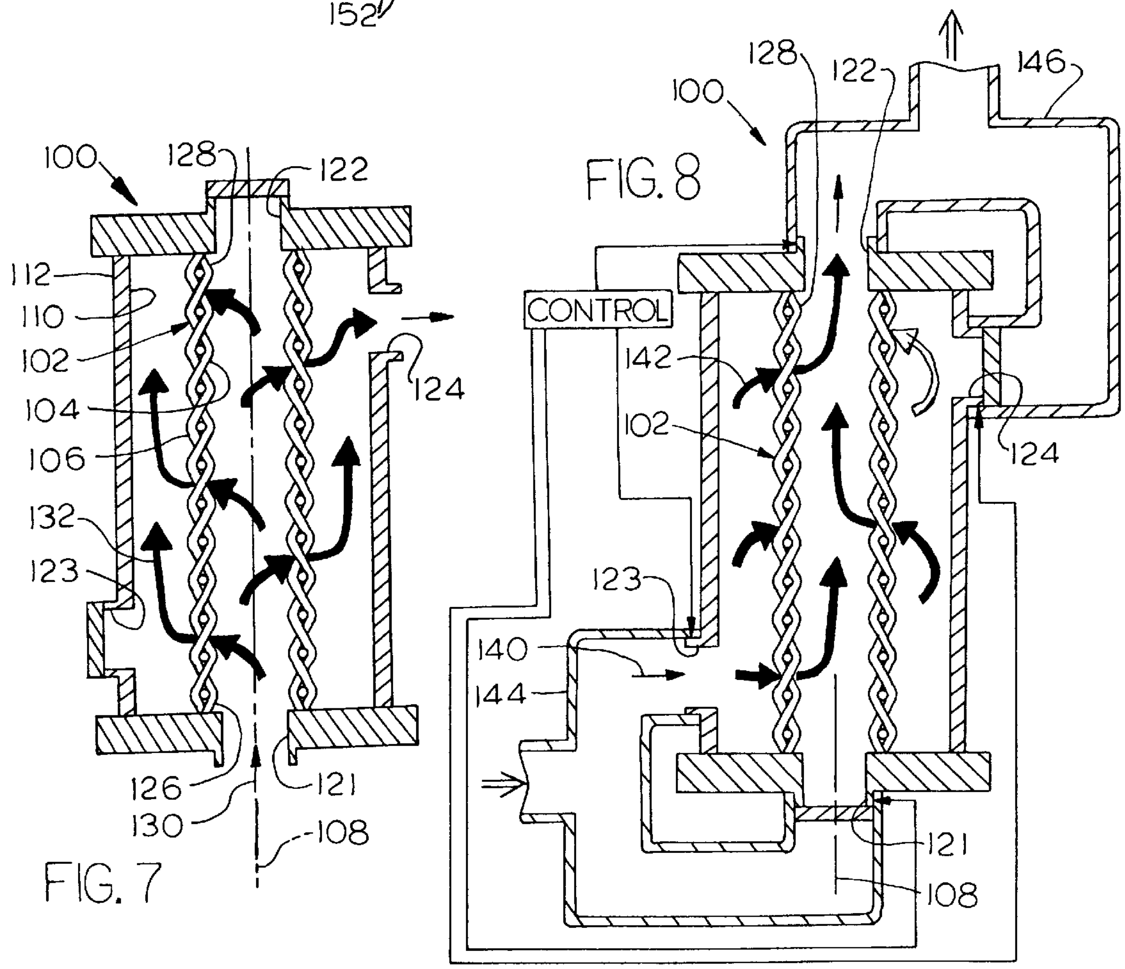
FIG. 7
FIG. 8

LIQUID MIXTURE SEPARATION SYSTEM

CROSS-REFERENCE TO RELATED CASE

This application claims the benefit of U.S. Provisional Application No. 60/010,733 filed Jan. 29, 1996.

BACKGROUND OF THE INVENTION

There are many industrial applications where it is necessary to separate first and second liquids. One application is in separating a small quantity of oil that is intimately mixed with water, so the oil can be recovered for use and the water can be disposed of without violating environmental regulations. A corresponding use is in separating a small amount of water contained in a larger quantity of oil, so the water does not harm machinery that uses the oil. Still another widespread use is in removing light organic components (e.g. kerosene) from an aqueous stream (e.g. water, or electrolyte, or raffinate) as described in U.S. Pat. No. 5,273,654. Larger droplets of the second liquid can be removed by known coalescing devices such as a plate coalescer. However, a high proportion of microscopic droplets, left after coalescing, cannot be removed by such devices.

A high proportion of microscopic droplets of one liquid, such as water mixed into oil, usually can be removed by pumping the mixture through a disposable filter such as an automobile oil filter. However, it is expensive to use such disposable filter where a large quantity of the second liquid must be removed. Perhaps 90% of microscopic droplets would eventually coalesce and rise to the surface of a settling tank, after a period of time of a few days to a few months (assuming the mixture was not disturbed), but this period is too long for most applications. It is noted that automobile filters, fine steel wool, and sintered metal can serve as filters, but they have long passages that clog and that are not readily cleaned by reverse flow. Such devices can be cleaned of oil and a small amount of solid particles by flowing a light hydrocarbon such as kerosene that dissolve them, but this results in the problem of how to environmentally dispose of the kerosene. A system for use in removing a high percentage of microscopic droplets of a second liquid contained in an intimate mixture with a first liquid, such as oil from water, water from oil, or organics from an aqueous stream, which was of moderate cost to construct and operate, would be of value.

SUMMARY OF THE INVENTION

In accordance with one embodiment of the present invention, a system is provided for use with an intimate mixture of first and second liquids, which coalesces microscopic droplets of the second liquid by passing the mixture through a screen, so the coalesced drops of the second liquid can be readily removed by conventional devices, which is highly of moderate cost and which is effective. The screen is formed of woven threads of a material that is wetted by the second liquid. The screen has very closely spaced threads so the screen retains fine particles such as those having a diameter no more than 25 microns. The mixture is pumped through the screen at a very low velocity such as no more than thirty centimeters per minute (twelve inches per minute). Applicant finds that by thus slowly moving the liquid through the very fine screen, that the microscopic droplets of the second liquid are coalesced by the screen into larger droplets that can be readily separated as by a conventional plate coalescer.

Flow through the woven screen is reversed at intervals, with the liquids passing through the screen being delivered to a coalescer for either direction of movement through the screen. Thus, the reversal is not a backwash. The fine screen can be wrapped around a rigid tube that has numerous holes, with a resilient holder wrapped around the screen to hold it in intimate contact with the outside of the tube.

The novel features of the invention are set forth with particularity in the appended claims. The invention will be best understood from the following description when read in conjunction with the accompanying drawings.

BRIEF DESCRIPTION OF THE DRAWINGS

FIG. 7 is a simplified sectional side view of a system constructed in accordance with another embodiment of the invention, shown in a first condition wherein a mixture moves radially outwardly through the walls of a tubular screen.

FIG. 8 is a view similar to that of FIG. 7, showing the system in an alternate configuration wherein fluid moves radially inwardly through the tubular screen, and also showing an additional portion of the system.

FIG. 9 is a partial isometric sectional view of the tubular screen of FIGS. 7 and 8.

FIG. 10 is a view taken on line 10—10 of FIG. 9.

FIG. 11 is an enlarged plan view of a portion of a screen of a plain weave construction.

DESCRIPTION OF THE PREFERRED EMBODIMENTS

Figure 1:
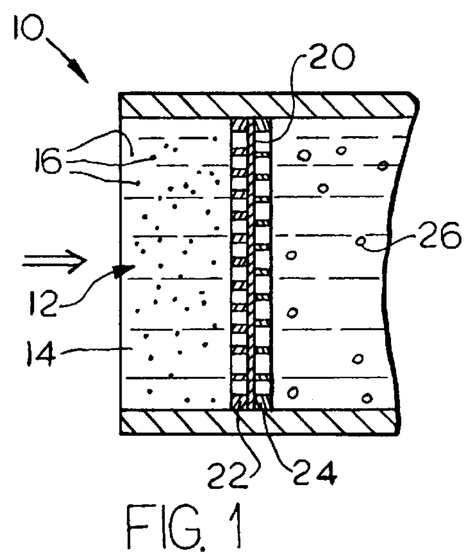
FIG. 1 is a simplified sectional view of a separation system constructed in accordance with one embodiment of the present invention.
Figure 4:
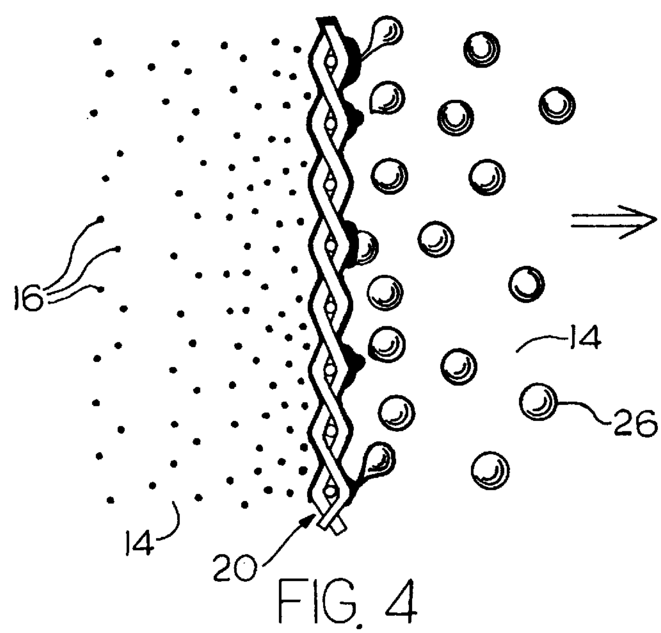
FIG. 4 is a greatly enlarged sectional view of a portion of the screen of FIG. 1, showing the manner in which the screen coalesces microscopic droplets of a second liquid that is contained in a first liquid.

FIG. 1 illustrates a separation system 10 for separating components of an intimate mixture 12 of liquid components, including a first liquid 14 (e.g. water) constituting most of the volume of the mixture, and with a second liquid (e.g. oil) present in the form of microscopic droplets 16. The system includes a screen 20 backed by backup plates 22, 24 having much larger holes than the pores in the screen. As the mixture passes through the screen, the screen causes the microscopic droplets 16 to coalesce and form much larger drops 26 of the second liquid. The larger drops can be removed from the first liquid 14 as by a plate coalescer, a settling tank, etc. It is noted that before the mixture is pumped through the screen, larger droplets and most solid particles already have been removed. This method for coalescing microscopic droplets into larger drops that can be more easily coalesced for removal, has been known. However, prior systems resulted in coalescing and consequent removal or recovery, of only a moderate percentage of the microscopic droplets of the second liquid.

Figure 5:
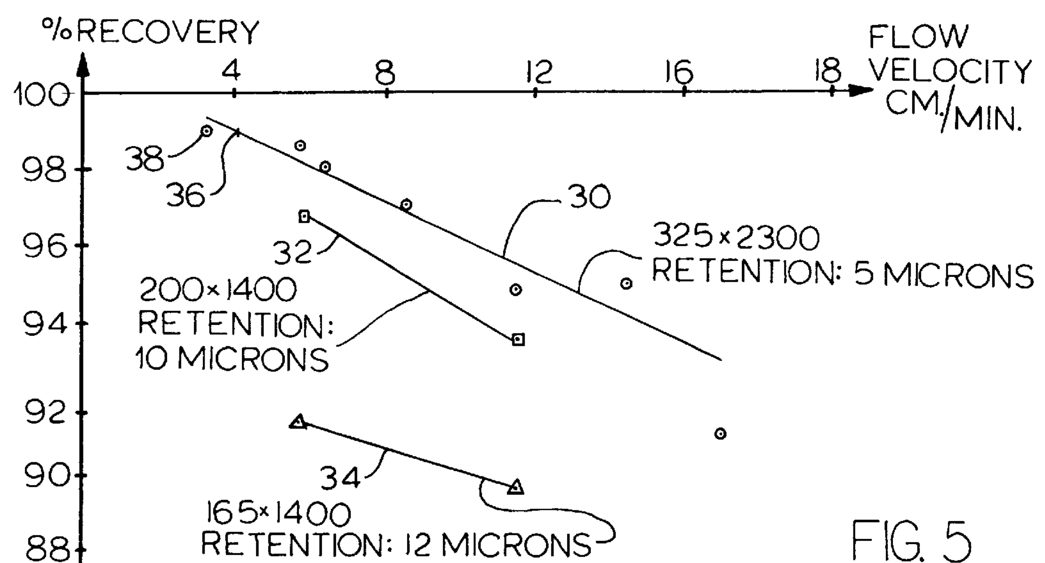
FIG. 5 contains graphs showing the percent recovery versus flow rate for the flow of a mixture of oil (hydrocarbon) in water, for flow through screens of different constructions.

In accordance with the present invention, applicant uses a very fine screen 20 and passes the mixture at a very low velocity through the screen. FIG. 5 shows the results of tests that applicant has conducted in the removal of oil (hydrocarbons) resulting from the flow of produced water, wherein the mixture pumped through the screens contained 560 milligrams of oil per liter of mixture, or in other words 560 ppm (parts per million) of oil. In FIG. 5, the vertical axis shows the percent recovery of the oil, which is the percent of oil recovered after the coalesced drops produced by the screen were coalesced by a screen coalescer. The horizontal axes include a lower one showing flow rate in gallons (each gallon comprises 231 cubic inches) per minute, per square foot of screen. The upper horizontal axis shows the flow velocity in centimeters per minute.

FIG. 5, graph 30 shows the characteristics for a fine screen, with stainless steel wires or threads present in a thread count of 325 strands per inch in the warp direction and 2300 strands per inch in the weave direction, the particular screen having a twilled dutch weave and supplied by Tylinter of Mentor, Ohio. This screen is specified to have a retention of five microns, which means that a flow of air with fine particles results in the screen blocking particles having a width of more than five microns. If one assumes that screens are constructed as shown in FIG. 11, where the width A of each pore 28 is one-half of the thread spacing or one-half the inverse of the thread count, then with a thread count of 2300 per inch (0.0004 inch or 11 microns center-to-center thread spacing) can be said to provide pores having a width A of 0.00022 inch, or five microns. Although the actual retention depends upon the weave, the thread count provides a good approximation of the retention (the retention is roughly one-half the center-to-center distance of the threads).

Graph 30 in FIG. 5 shows that for the 325×2300 screen, the percent recovery increased as the flow velocity through the screen decreased. That is, the percent recovery approached 100% for a flow velocity of less than 4 cm./min. and decreased to about 93% for a flow velocity of about 17 cm./min. The graph 30 indicates that the recovery progressively decreases with increasing flow velocity, that a flow velocity of no more than about 12 cm./min. should be maintained in order to obtain a recovery of at least 95%, and that a flow velocity below about 18 or 20 cm./min. should be maintained for a recovery of at least 90%. A linear extension of graph 30 indicates that a recovery of above 80% can be maintained for a flow velocity of up to 30 cm./min.

Graph 32 shows the characteristics for a 200×1400 stainless steel screen (twilled dutch weave), having a specified retention of ten microns. It is noted that in FIG. 11, a thread count of 1400 indicates a thread spacing B of 17.5 microns and a pore width A (or retention) of nine microns, which is close to the actual retention of ten microns. This larger screen 32 resulted in a decreased recovery for the same flow velocity, as compared to screen 30. However, the recovery was over 93% for a flow velocity of no more than 12 cm./min., and indicates a recovery of over 90% for a flow velocity of under 18 cm./min. FIG. 5 shows a graph 34 for another screen with stainless steel threads having a count of 165×1400 (twilled dutch weave), and with the screen having a stated retention of twelve microns. The recovery was lower for the screen of graph 32, but was still above 90% for a flow velocity of no more than about 12 cm./min. It is noted that for the screen of graph 34, the nominal pore size is 9 microns, although the measured retention is 12 microns.

The graphs of FIG. 5 indicate that a high recovery of over 90% can be obtained by pumping an oil-water mixture through a fine screen where the thread count is at least 1400 per inch (55 per millimeter), and by flowing the mixture at a velocity of no more than about 12 cm./min. The above also indicates that it is preferred that the retention of the screen be no more than about twelve microns. It is noted that a recovery of 95% results in the oil content of 560 ppm being reduced to 28 ppm, while a recovery of 99% (shown at point 36 on graph 30, for a flow velocity of about 4 cm./min.) results in only about 6 ppm of oil in water. In actual tests, the point 38 resulted in a reduction from 560 ppm to 7 ppm. The graph indicates that over 80% recovery can be obtained by a flow rate of up to 30 cm./min. through a screen of retention of 5 microns, and by a flow rate of up to 26 cm./min. for screens of 10 or 12 microns retention.

Figure 6:
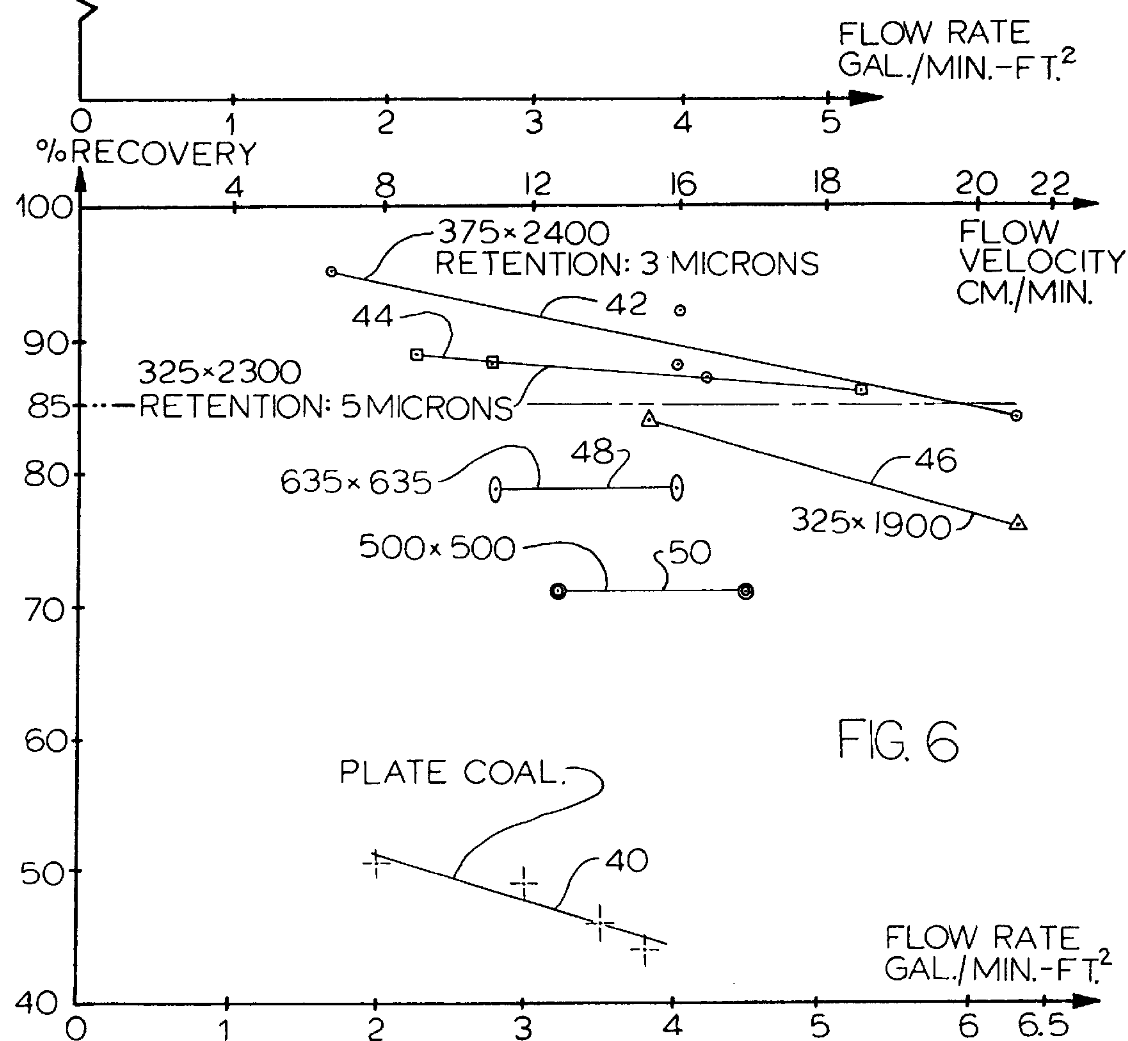
FIG. 6 contains graphs showing the percent recovery versus flow rate for the flow of a mixture of kerosene in a water-diluted acid, for flow through screens of different constructions.

FIG. 6 contains graphs showing the percent recovery of a light organic, specifically kerosene, from an electrolyte stream comprising 2% hydrochloric acid and 0.5% copper sulfate in water, with 130 ppm of kerosene (0.8 centipoise at room temperature) present after initial large drop removal. Light organics can be defined as those having a viscosity on the same order of magnitude as water (1 centipoise) at room temperature (22° C.), or a viscosity of no more than 10 centipoise. The removal of organics from such an aqueous stream is important in solvent extraction mining, or heap leaching, especially in copper mining, as described in U.S. Pat. No. 5,273,654. Previously, plate coalescing alone has been used, which resulted in a recovery of kerosene of no more than about 50%. A recovery which left only half as much, which would be a recovery of at least 70% or 75%, would be of great benefit.

Graph 40 in FIG. 6 shows recovery by a plate coalescer, where the mixture moves at a very low velocity through the coalescer. Graph 42 shows the recovery for a 375×2400 stainless steel screen that has a stated retention of three microns. It is noted that a thread count of 2400 would result in a pore width about five microns for the weave of FIG. 11, although a wide variety of weaves are available that affect the retention. The recovery of kerosene from an aqueous liquid is at least 95% for a flow velocity of no more than about 8 cm./min, and was measured to be about 85% for flow rates of up to 21 cm./min. The graph 42 indicates a recovery of over 70% for a flow rate of up to 30 cm./min. Graph 44 shows the recovery characteristics for a screen having a thread count of 325×2300 and a stated retention of five microns. Although the recovery is not as good as for the screen of graph 42, the recovery for graph 44 is still above 85% for a flow velocity of up to 18 to 20 cm./min, and above 75% for all tested flow rates (up to 21 cm./min.).

Graph 46 shows the recovery of kerosene using a screen having a thread count of 325×1900 (twilled dutch weave) and a stated retention of 5 microns. The recovery was somewhat less than for graphs 42 and 44, but was still above 75% for flow velocities of up to 21 cm./min. Graph 48 shows recovery for a screen having a thread count of 635×635 (twill square weave), a stated opening size of 20 microns, and an indicated retention of 20 microns (per FIG. 11). This screen did not perform as well as those of graphs 42, 44, and 46, in that applicant obtained a recovery of about 79% for flow velocities of 11 to 16 cm./min. The graphs 42, 44, 46 and 48 all indicate a recovery of over 75% for a flow rate of up to 20 cm./min.

Another screen with coarser threads was tested, with graph 50 representing the results for a screen thread count of 500×500 (twill square weave), and a stated opening size of 25 microns. This indicates that when the largest thread count at least 500 to the inch, a recovery of at least 70% can be obtained for a flow rate of up to 17 cm./min. This is far superior to that obtained with a plate coalescer.

Applicant has used the 375×2400 stainless steel screen to separate out a small amount of water mixed into an organic solvent used in copper leaching. The organic solvent included kerosene and an extractant which was type L1X984 sold by Henkei Corporation. The water constituted 300 to 800 ppm of the mixture. In test flow rates of up to 7 cm./min., no trace water was found in the outlet fluid.

Figure 2:
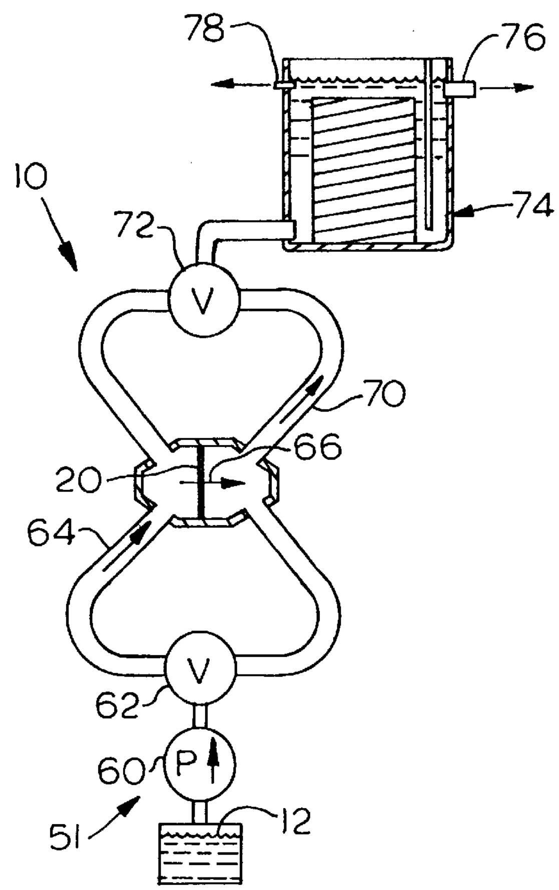
FIG. 2 is a simplified view of the system that includes the portion of FIG. 1, shown during flow of the mixture in a first direction through the screen.
Figure 3:
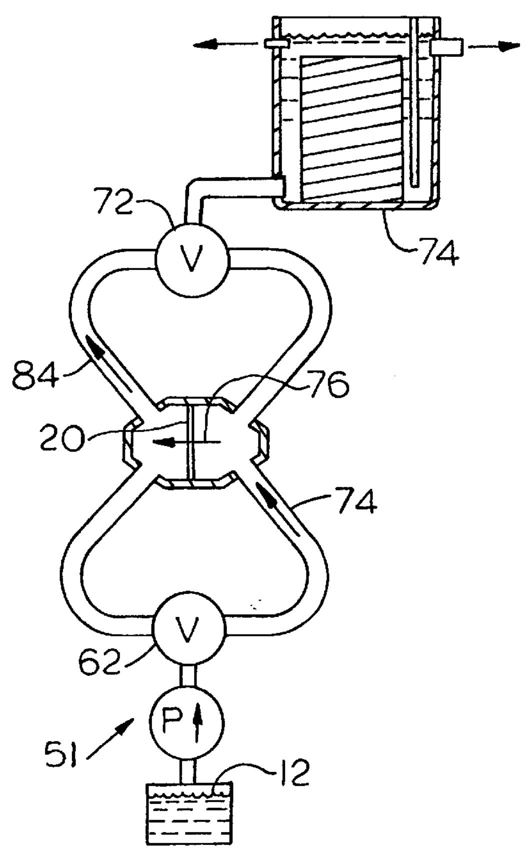
FIG. 3 is a view similar to that of FIG. 2, but shown during flow of the mixture in a second direction through the screen.

FIGS. 2 and 3 are simplified views of a system that includes the screen 20 and a fluid directing arrangement 51 that includes a pump device 60, valves 62, 72, and conduits 64, 70, 74, 84. The system uses the screen 20 to coalesce microscopic droplets contained in an intimate mixture 12 of the droplets of second liquid in primarily a first liquid. The mixture 12 is pumped through the pump device 60 (a pump, pressure by gravity, etc.) and through valve 62. Initially, the valve directs flow along first conduit 64 so the fluid passes in a first direction 66 through the screen 20. The liquid then passes through conduit 70 and through valve 72, which directs the flow into a plate coalescer 74. The first liquid such as water emerges through a first outlet 76 of the coalescer, while the second liquid such as oil emerges through a second outlet 78 of the plate coalescer.

After a period of operation (e.g. less than one hour) of the system 10 of FIG. 2, the screen 20 becomes clogged with particles (other than the first and second liquids). In that case, applicant reverses flow, by operating the system as shown in FIG. 3. In FIG. 3 the valves 62 and 72 are switched so fluid moves through a second conduit 74, in a second direction 76 through the screen, and through conduit 84 and valve 72 to the coalescer 74. Applicant maintains a pressure drop across the screen of about 70 kPa, and switches the valves when the pressure difference across the screen has increased by about one-half.

FIG. 7 shows another system 100 that applicant has constructed, which was found to be especially useful in carrying out the process of the present invention. A screen 102 of the characteristics described above, is in the form of a tube having an inside 104, an outside 106, and an axis 108. The screen lies within a chamber 110 of a container 112. The chamber has four ports 121, 122, 123, and 124, with open-close valves at each port. The inside 104 of the tubular screen is connected at one end 126 to the first port, and is connected at its opposite end 128 to the second port. The third and forth ports 123, 124 are connected to the outside 106 of the screen, at the walls of the chamber. Initially a mixture to be separated is pumped into the first port 121 as indicated by arrow 130. The mixture moves in the paths indicated by arrows 132 wherein the mixture moves radially outwardly through the screen tube (the radial direction is with respect to the tube axis 108). The mixture then moves out through the fourth port 124.

After a while, the screen tube 102 becomes clogged, as with microscopic solid particles. When this occurs, the direction of flow is reversed, so it is as shown in FIG. 8. In FIG. 8 the mixture enters the chamber along the path 140 to flow into the third port 123. The fluid then moves along the paths 142 in a radially inward direction through the screen tube 102, and out through the tube end 128 and second chamber port 122. FIG. 8 shows additional fluid conduits including an inlet conduit 144 where fluid can flow into either of the ports 121, 123, and an outlet conduit 146 that carries fluid that has passed through either of the outlet ports 122, 124.

FIG. 9 shows the construction of the tube screen 102. The tube screen includes a substantially rigid support tube 150 which has numerous through holes 152 between its primarily cylindrical tube inner surface 154 and its tube outer surface 156. A layer of screen 160 of the construction described above for FIGS. 5 and 6, is wrapped around the support tube 150, with opposite sides of the screen sealed together, as by overlapping them (and possibly using adhesive thereat). A holder 162 presses the screen 160 against the outer surface of the support tube 150. One example of a holder 162 is a wire that is wrapped in a helical path around the screen 160 and that forms gaps or holes 163 between adjacent turns. Such wire 162 is preferably resilient, as by constructing it out of plastic which has a Young's Modulus of Elasticity of less than 300,000 psi and preferably less than 100,000 psi. Another example is a tube of thin elastic material (e.g. in the shape of a Chinese finger-gripping tube toy) that is expanded to fit around the screen 160, and that then compresses itself and compresses the screen against the support tube. Still another example is a shrink tube with numerous holes, which is heat shrunk around the screen 160. In all of these cases, the screen 160 with a thread count of at least 600 in one direction (nominal pore width of no more than 0.0008 inch, or 0.02 mm) is supported on its inside and outside by more rugged material which has large holes that each have a width of at least 1 mm. FIG. 10 shows that the screen 160 is sandwiched between the support tube 150 and the holder 162. It is noted that this construction has been used to hold membranes (but with flow in only one direction allowed for a membrane).

Thus, the invention provides an apparatus and method for coalescing microscopic droplets of a second liquid that is contained in a first liquid, which provides high recovery of at least 75% in a system of simple construction and operation. The system is useful in coalescing microscopic droplets of oil in water or water in oil, and microscopic droplets of an organic material such as kerosene in a aqueous solution such as a water-diluted acid. The mixture is passed through a very fine screen, where the thread count in one direction is at least five hundred per inch and the flow velocity is no more than about 30 cm./min. A fine screen has relatively narrow pores, and clogging can be avoided by reversing the direction of flow through the screen, such as when the pressure drop increases by one-half from an initial pressure difference across the screen. The system is useful in many situations, including purification of produced water in an oil field to below 27 ppm which is a preferred level for environmental disposal, removal of oil from water, recovery of kerosene from solvent extraction fluid (usually including acid in primarily water) and dehydration of oils and organics (e.g. kerosene).

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A system for use with an intimate mixture of first and second liquids, for coalescing microscopic droplets of the second liquid out of the first liquid, by passing the mixture through a screen, comprising:

- a screen formed of woven threads of a material that is wetted by said second liquid, said screen having a thread count in a first direction which is at least 500 per inch (20 per mm);
- pump means for flowing said mixture through said screen at an average velocity of less than 30 centimeters per minute (12 inches/min) through said screen.

2. The system described in claim 1 wherein:

said screen has a thread count of at least 1400 in one direction and a retention of no more than 12 microns, and said pump means is constructed to flow said mixture at an average velocity of no more than 20 cm./min.

3. The system described in claim 1 wherein:

said screen is in the form of a tubular screen (102) having tubular screen walls (108) and an axis, said tubular screen having an inside (104) and an outside (106) and having first and second tubular screen ends (126, 128);

walls forming a chamber (110) that surrounds said tubular screen, with said chamber walls forming first and second chamber ports (123, 124) that open respectively to said first and second tubular screen ends at the inside of the tubular screen, said chamber walls having third and fourth chamber ports (123, 124) that each opens to the outside of said tubular screen;

a fluid directing arrangement that flows said intimate mixture of liquids into said chamber through said first port (121) and radially outwardly through said tubular screen walls, and that flows said liquids out of said chamber through said fourth port (124), and that alternately flows said mixture of liquids into said chamber through said third port (123) and radially inwardly through said tube screen walls, and that flows said liquids out of said tubular screen and out of said chamber through said second port (122).

4. A system for use with an intimate mixture of first and second liquids, for separating them, comprising:

a screen in the form of a tubular screen (102) having tubular screen walls and an axis (108), said tubular screen having an inside (104) and an outside (106) and having first and second tubular ends (126, 128);

walls forming a chamber (110) that surrounds said tubular screen, with said chamber walls forming first and second chamber ports (121, 122) that open respectively to said first and second tubular ends at the inside of the tubular screen, said chamber walls having third and forth chamber ports (123, 124) that each opens to the outside of said tubular screen;

a fluid directing arrangement that flows said intimate mixture of liquids into said chamber and into said tubular screen through said first port (121) and radially outwardly through said tubular screen walls, and that flows said liquids out of said chamber through said fourth port (124), and that alternately flows said mixture of liquids into said chamber through said third port (123) and radially inwardly through said tubular screen walls, and that flows said liquids out of said tubular screen and out of said chamber through said second port (122).

5. The system described in claim 4 wherein:

said screen has a thread count of at least 500 threads per inch in one direction.

6. A method for treating an intimate mixture of a first liquid in microscopic droplets of a second liquid, comprising:

establishing a woven screen along a flow path, wherein said screen has a retention of no more than about 25 microns;

flowing said mixture through said screen in a flow path that is perpendicular to the woven screen at a velocity of no more than about 30 centimeters per minute, to thereby coalesce droplets of said second liquid.

7. The method described in claim 6 wherein:

said screen comprises woven threads of material that is wetted by said second liquid;

said step of flowing said mixture includes flowing said microscopic droplets against said threads to coat said threads with said second liquid, and allowing drops of said second liquid that are many times larger than said microscopic droplets, to break away from said screen and flow with said first liquid away from said screen;

flowing said drops of said second liquid to a second coalescing device and separating said second liquid from said first liquid.

8. A method for treating a mixture of liquids that comprise oil and water to separate them, comprising:

flowing said mixture through a woven screen having a thread count on the order of magnitude of at least 1400 per inch in one count direction, and at velocity of no more than about 12 centimeters per minute to produce drops of a first of said liquids in said second liquid in a flow path that is perpendicular to the woven screen;

passing said mixture after it has flowed through said screen, into a coalescer to separate said liquids.

9. A method for treating a mixture of liquids that includes a light organic liquid having a viscosity of no more than 10 centipoise at 22° C., in an aqueous solution having a viscosity of no more than 10 centipoise at 22° C., comprising:

flowing said mixture through a woven screen having a thread count on the order of magnitude of at least 1400 per inch in one thread count direction, and at velocity of no more than about 12 centimeters per minute to produce drops of a first of said liquids in said second liquid;

passing said mixture, after it has flowed through said screen, into a coalescer to separate said liquids.

* * * * *